United States Patent [19]

Kaneko et al.

[11] Patent Number: 4,841,558
[45] Date of Patent: Jun. 20, 1989

[54] FRONT PLATE FOR X-RAY CASSETTES

[75] Inventors: Shoji Kaneko, Saitama; Atsumi Nakamura, Chiba, both of Japan

[73] Assignee: Somar Corporation, Tokyo, Japan

[21] Appl. No.: 94,784

[22] Filed: Sep. 10, 1987

[30] Foreign Application Priority Data

Sep. 10, 1986 [JP] Japan .......................... 61-138829[U]

[51] Int. Cl.⁴ ........................ B32B 5/12; G03B 42/04
[52] U.S. Cl. .................................. 378/182; 428/110; 428/113
[58] Field of Search ...................... 428/105, 110, 113; 378/182, 185

[56] References Cited

U.S. PATENT DOCUMENTS 4,549,933 10/1985 Judd et al. ..................... 428/113 X
4,638,501 1/1987 Nishi et al. ......................... 378/182

Primary Examiner—Alexander S. Thomas
Attorney, Agent, or Firm—Sughrue, Mion, Zinn, Macpeak & Seas

[57] ABSTRACT

A front plate for X-ray film cassettes, is disclosed in which outer layers made up of carbon fiber reinforced resin layers are laid on both surfaces of an intermediate layer made up of synthetic fiber reinforced resin layers, respectively, and outmost layers made up of synthetic fiber reinforced resin layers are laid on the outer surfaces of the carbon fiber reinforced resin layers, respectively, to form a multi-layer structure.

9 Claims, 1 Drawing Sheet

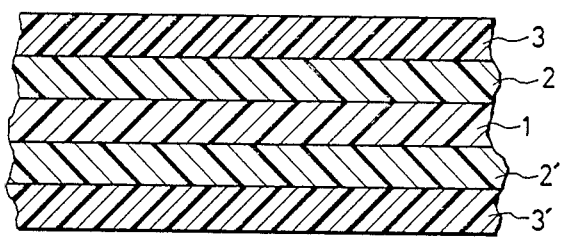

FRONT PLATE FOR X-RAY CASSETTES

BACKGROUND OF THE INVENTION

This invention relates to an X-ray film cassette front plate used for a medical X-ray photographing device or the like. The term "front plate" as used herein is intended to means the front plate of an X-ray film cassette which is confronted with an X-ray source.

In general, an X-ray film cassette is made up of a front plate which is confronted with an X-ray source, a frame extending from the periphery of the front plate, and a rear plate coupled to the frame.

Heretofore, an aluminum plate or Bakelite plate is generally used to form an X-ray film cassette, because it is excellent in penetrability and uniform in material quality, and it can readily be transported being light in weight. On the other hand, instead of the X-ray film cassette, an X-ray film cassette of carbon-fiber-reinforced plastic (CFRP) has been proposed recently.

One example of the plate for the X-ray film cassette of CFRP comprises: a laminate of a carbon-fiber-reinforce plastic material with carbon fiber aligned and other X-ray penetrable materials; and carbon-fiber reinforced plastic layers formed on both surfaces of the laminate and those provided in such a manner that they are positioned symmetrical in a section of the laminate (cf. Japanese Utility Model Unexamined Publication No. 121467/1976). Another example of the plate is made up of an intermediate layer which is a carbon-fiber-reinforced resin layer, and aromatic polyamide fiber reinforced resin layers formed on both surfaces of the intermediate layer (cf. Japanese Utility Model Unexamined Publication No. 60255/1986).

The former is disadvantageous in the following points: Since the outermost layers are the CFRP layers, when the plate is cut to desired dimensions, the carbon fibers are finely split at the sections; that is, the resultant product is low in quality. It is rather difficult to completely remove the carbon fibers thus split. The plate is low in lightness or brightness because of its black surfaces. It is difficult to improve the lightness during molding by coloring the prepreg.

The latter is free from the fine splits of carbon fibers. However, the outermost layers, namely, the polyamide fiber reinforced resins layers are low in light-fastness, changes color with the lapse of time. Furthermore, it is rather difficult to cut the plate. That is, it must be cut with a special cutting edge such as a diamond head while being cooled with water or the like.

OBJECTS AND SUMMARY OF THE INVENTION

Accordingly, an object of this invention is to provide a front plate for X-ray film cassettes in which the above-described difficulties have been eliminated. More specifically, an object of the invention is to provide a front plate for X-ray film cassettes which is excellent in X-ray transmissivity, the most important characteristic of X-ray film cassettes, and which can be finely machined (or cut) and is high in impact resistance and light in weight, and in which the outermost layers can readily be colored.

The foregoing object of the invention has been achieved by the provision of a front plate for X-ray film cassettes in which, according to the invention, outer layers made up of carbon fiber reinforced resin layers are laid on both surfaces of an intermediate layer made up of synthetic fiber reinforced resin layers, respectively, and outermost layers made up of synthetic fiber reinforced resin layers are laid on the outer surfaces of the carbon fiber reinforced resin layers, respectively, to form a multi-layer structure.

BRIEF DESCRIPTION OF THE DRAWING

In the accompanying drawing, the single FIGURE is an explanatory diagram showing the fundamental structure of an x-ray film cassette front plate according to this invention.

DESCRIPTION OF THE PREFERRED EMBODIMENTS

The fundamental structure of an X-ray film cassette front plate according to the invention will be described with reference to the accompanying drawings.

In the single FIGURE in the accompanying drawing, reference numeral 1 designates an intermediate layer; 2 and 2', outer layers formed on both surfaces of the intermediate layers 1, respectively, and 3 and 3', outermost layers formed on the outer surfaces of the outer layers 2 and 2', respectively.

In the plate according to the invention, it is essential that the outer layers 2 and 2', formed on both surfaces of the intermediate layer 1 which is a synthetic fiber reinforced resin layers, are made of CFRP.

One example of the layers of CFRP is a resin-impregnated sheet which is formed by impregnating a carbon fiber sheet such as a carbon fiber sheet in which carbon fibers are parallel in one direction (hereinafter referred to as "a paralleled carbon fiber sheet", when applicable) and a carbon fiber cross sheet with thermo-setting resin. In this example, the quantity of the resin impregnated into the sheet is generally 30% to 50% of the weight of the sheet. The thickness of the CFRP layers is controlled according to the thickness of the central layer, i.e., the synthetic fiber reinforced resin layer 1. When it is required to lay a plurality of sheets one on another each of which is formed by impregnating a parallel fiber sheet with resin, they should be laminated in such a manner that adjacent sheets are different in fiber filament paralleling direction (i.e., the fiber filament paralleling direction of a sheet is perpendicular to that of the next sheet). However, it is desirable to use sheets formed by impregnating fiber cross sheets with resin, to maintain the sheets thus laminated under pressure stable in dimension and to prevent them from being twisted.

On the other hand, when it is required to compose each of the CFRP layers of a single sheet, it is preferable that the fiber filament direction of the upper outer layer 2 is perpendicular to that of the lower outer layer 2'.

One example of the synthetic fiber reinforced material forming the intermediate layer 1 and the outermost layers 3 and 3' is a resin-impregnated sheet which is prepared by impregnating a polyester fiber or VINYLON (polyvinyl alcohol synthetic resin) fiber sheet or cross sheet with thermo-setting resin such as epoxy resin, unsaturable polyester resin or phenol resin. The quantity of the resin impregnated into the sheet may be substantially equal to that in the case of the CFRP layer. Among these material, the polyester or VINYLON (polyvinyl alcohol synthetic resin) fiber reinforced materials low in thermal contraction and a material reinforced with the mixture of polyester and VINYLON (polyvinyl alcohol synthetic resin) fibers are most suitable for formation of the plate, because the plate made of these material is scarcely bent or twisted.

It is not always necessary that the intermediate layer 1 and the outermost layers 3 and 3' use one and the same material.

It is preferable that the thickness of the intermediate layer be in a range of from 0.5 mm to 1.5 mm, the thickness of the outer layers (CFRP layers) be in a range of from 0.2 mm to 0.5 mm, and the thickness of the outermost layers be in a range of from 0.1 mm to 0.5 mm. It is desirable that the thickness of the plate consisting of these layers be in a range of from 1.5 mm to 2.5 mm. If the CRFP layers are excessively small in thickness, then the resultant front plate is low in mechanical characteristic such as for instance bending elasticity. If, on the other hand, the CRFP layers are extremely large in thickness, then the resultant front plate is low in X-ray transmission; that is, it is no longer used as a front plate for an X-ray film cassette, and the X-ray film cassette formed with the plate is increased in weight as much. The outermost layers may be different in thickness from each other; however, it is desirable that the outermost layers be equal in thickness, because the resultant front plate is scarcely bent or twisted. When the outermost layers are excessively large in thickness, the resultant front plate is large in weight as much, but it is not so high in rigidity, and its X-ray transmission is lowered. If, on the other hand, the outermost layers are excessively small in thickness, the carbon fibers of the CFRP layers are unavoidably finely split when the resultant front plate is cut, and the surface lightness is decreased.

The front plate according to the invention is formed as follows: The above-described layers which have been prepared in advance are laminated as described above, and are then combined into one unit. The layers are combined together generally by heating and pressing. The layers may be combined together by fusing or with adhesive.

In the front plate of the invention, the surfaces of the outermost layers may be covered with a film or sheet or paint which transmits X-rays and is high in abrasion resistance and in ultra-violet ray resistance.

As was described above, when the front plate of the invention is cut as required, fine splits or nap is scarcely raised; that is, the front plate can be finely cut. Furthermore, the front plate of the invention if high in lightness and in lightfastness. In addition, the front plate of the invention is lighter in weight and higher in X-ray transmission percentage than a conventional one which is equal in thickness to the front plate of the invention.

EXAMPLES

The invention will be described with reference to its concrete example in more detail.

CONCRETE EXAMPLE

A polyethyleneterephthalate fiber plain weave cloth (weight: 240 g/m$_2$; external appearance: white) T-11154 (manufactured by Teijin Co., Ltd.) was impregnated with epoxy resin (in a rate of 45% by weight) to prepare a polyester fiber cloth reinforced epoxy resin prepreg. The prepreg was used as the intermediate layer and the outermost layers.

A sheet with carbon fiber filaments (6000 filaments) paralleled in one direction was impregnated with epoxy resin (in a rate of 38% by weight) to prepare a carbon fiber reinforced epoxy resin prepreg (carbon fiber "Metsuke (weight)" 150 g/m$^2$). Four polyester fiber cloth reinforced epoxy resin prepregs were laid one on another to form the intermediate layer. The above-described carbon fiber reinforced epoxy resin prepregs were laid on both surfaces of the intermediate layer thus formed in such a manner that the direction of fibers of one of the prepregs was perpendicular to the direction of fibers of the other. A sheet of polyester fiber cloth epoxy resin was laid on the outer surface of each of the carbon fiber reinforced epoxy resin prepregs thus laid to form a multi-layer structure. The multi-layer structure was pressed at a temperature of 130° C., thus providing a X-ray film cassette front plate (377×453×2.1 mm$^3$) as illustrated. The characteristics of the front plate thus formed are as indicated in Table 1 below.

COMPARISON EXAMPLE 1

The prepregs prepared in Concrete Example above were utilized. Six polyester reinforced epoxy resin prepregs were laid one on another to form the intermediate layer. The carbon fiber reinforced epoxy resin prepregs were laid on both surfaces of the intermediate layer in such a manner that the direction of fiber of one of the prepregs was perpendicular to the direction of fibers of the other, to form a multi-layer structure. The multi-layer structure was heated and pressed under the same condition as that in Concrete Example, to form a front plate.

COMPARISON EXAMPLE 2

A poly-p-phenyleneterephthalamide (a kind of aromatic polyamide, light yellow appearance) fiber cloth ("Metsuke (weight)" 75 g/m$^2$) was impregnated with epoxy resin (in a rate of 43% by weight) to prepare an aromatic polyamide fiber cloth reinforced epoxy resin prepreg.

Four carbon fiber reinforced epoxy resin prepregs prepared in the above-described Concrete Example were laminated to form an intermediate layer as follows: Two of the four prepregs were laid one on another in such a manner that the carbon fibers thereof were extended in the same direction, and the remaining two prepregs were laid on the outer surfaces of the aforementioned two prepregs, respectively, in such a manner that the direction of carbon fibers of the former was perpendicular to the direction of carbon fibers of the latter. Six aromatic polyamide fiber cloth reinforced epoxy resins prepregs were laid on each of the two surfaces of the intermediate layer to form a multi-layer structure. The multi-layer structure was heated and pressed under the same condition as those in the above-described Concrete Example, to prepare an X-ray film cassette front plate. The characteristics of the front plate thus formed are indicated in Table 1 below.

The X-ray transmissivity, cutting characteristic, lightfastness and lightness of the front plates of Concrete Example and Comparison Examples 1 and 2 are as listed in the following Table 1:

TABLE 1

|  | Concrete Example | Comparison Example 1 | Comparison Example 2 |
| --- | --- | --- | --- |
| X-ray transmissivity | Satisfactory | Satisfactory | Satisfactory |
| Cutting characteristic | O | X | X |
| Lightfastness | O | O | X |
| Lightness | O | X | O |

Cutting characteristic

In Table 1, the mark "X" indicate the front plates which were burred or finely split when cut with a chip saw, and "O" the front plates which were not burred nor finely split when cut.

Lightfastness

The front plates were held outdoors for one month so as to be exposed to the sun light, and the degrees of change in color thereof were detected. In Table 1, the mark "X" indicate the front plates which were greatly changed in color, and "O" the front plates which were not changed in color.

Lightness

The lightness of the front plates was measured according to JIS Z8721. In Table 1, the mark "O" indicate the front plates which showed a lightness of 4 or more "X" the front plates which showed a lightness of 3 of less. The mark "O" means the fact that the front plate can be handled in a dark room with ease.

We claim:

1. An x-ray film cassette comprising:
   a front plate;
   a frame extending from the periphery of said front plate; and
   a rear plate coupled to said frame; said front plate comprising an intermediate layer made up of synthetic fiber reinforced resin layers, two outer layers made up of carbon fiber reinforced resin layers, said two outer layers being laid on the outer surfaces of said intermediate layer, respectively and two outermost layers made up of synthetic fiber reinforced resin layers, said two outermost layers being laid on the outer surfaces of said outer layers, respectively, thus forming a multi-layer structure.

2. The x-ray film cassette of claim 1, wherein said synthetic fiber reinforced resin layers comprise polyester fiber.

3. The x-ray film cassette of claim 1, wherein said synthetic fiber reinforced resin layers comprise polyvinyl alcohol synthetic resin fiber.

4. The x-ray film cassette of claim 1, wherein said synthetic fiber reinforced resin layers comprise a mixture of polyester fiber and polyvinyl alcohol synthetic resin fiber.

5. The x-ray film cassette of claim 1, wherein a thickness of said intermediate layer is in the range of 0.5 to 1.5 mm, a thickness of the outer layers is in the range of 0.2 to 0.5 mm, and a thickness of the outermost layers is in the range of 0.1 to 0.5 mm.

6. The x-ray film cassette of claim 1, wherein a thickness of said front plate is in the range of 1.5 to 2.5 mm.

7. The x-ray film cassette of claim 1, wherein said synthetic fiber reinforced resin layers comprise plain weave cloth.

8. The x-ray film cassette of claim 1, wherein said carbon fiber reinforced resin layers each have a plurality of sheets one on another laminated in such a manner that a fiber filament paralleling direction of one sheet is perpendicular to that of the adjacent sheet.

9. The x-ray film cassette of claim 1, wherein said carbon fiber reinforced resin layers is each composed of a single sheet, and a fiber filament paralleling direction of one of said carbon reinforced resin layers is perpendicular to that of the other.

* * * * *